United States Patent
Izumi

(10) Patent No.: US 6,622,668 B2
(45) Date of Patent: Sep. 23, 2003

(54) CONSTRUCTION MACHINERY

(75) Inventor: Hideyuki Izumi, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/048,570

(22) PCT Filed: Mar. 26, 2001

(86) PCT No.: PCT/JP01/02399
§ 371 (c)(1),
(2), (4) Date: Feb. 4, 2002

(87) PCT Pub. No.: WO01/94706
PCT Pub. Date: Dec. 13, 2001

(65) Prior Publication Data
US 2002/0104491 A1 Aug. 8, 2002

(30) Foreign Application Priority Data
Jun. 2, 2000 (JP) .................................. 2000-166782

(51) Int. Cl.$^7$ .................................................. F01P 7/10
(52) U.S. Cl. ................................................... 123/41.49
(58) Field of Search ........................... 123/41.49, 41.11, 123/41.31, 41.48, 198 E, 41.12, 41.1, 41.02; 180/68.1, 68.3

(56) References Cited

U.S. PATENT DOCUMENTS 5,884,589 A * 3/1999 Sakamoto et al. ....... 123/41.49
6,032,620 A * 3/2000 Tsukiana et al. ......... 123/41.48
6,076,488 A * 6/2000 Yamagishi ................ 123/41.12
6,390,770 B1 * 5/2002 Takeshita .................... 415/119

FOREIGN PATENT DOCUMENTS

| JP | 8-11551 | 1/1996 |
| JP | 11-350530 | 12/1999 |
| JP | 2000-145455 | 5/2000 |

* cited by examiner

Primary Examiner—Henry C. Yuen
Assistant Examiner—Hyder Ali
(74) Attorney, Agent, or Firm—Morrison & Foerster LLP

(57) ABSTRACT

The present invention relates to a construction machine, which is equipped with an engine (22), a first cooling unit group (R) consisting of a plurality of cooling units, and a second cooling unit group (R1) where some cooling units in the first cooling unit group (R) are disposed in parallel. The remaining cooling unit (RN) of the first cooling unit group (R) is disposed with a gap (D) between itself and the second cooling unit group (R1), or is disposed in parallel with the second cooling unit group (R1). The construction machine is further equipped with a cooling fan (20) disposed so that it faces the cooling units disposed as described above. With this arrangement, the construction machine is capable of easily cleaning the cooling units, enhancing the cooling efficiency, and reducing the leakage of noise from the machine to the outside.

17 Claims, 10 Drawing Sheets

PRIOR ART

CONSTRUCTION MACHINERY

FIELD OF THE INVENTION

The present invention relates to a construction machine equipped with an engine and a plurality of cooling units, in which some of the cooling units are disposed in parallel and cooled with a single cooling fan in order to enhance the cooling efficiency, reduce the leakage of operation noise, and facilitate the cooling of the cooling units.

BACKGROUND ART

Construction machines include, for example, a hydraulic shovel that performs a digging operation for a dam, a tunnel, a road, water supply and drainage, etc., or a dismantling operation for constructions, etc.

The hydraulic shovel is constructed of a lower travel body, an upper swivel body supported on the lower travel body so that it can swivel, and a working unit provided on the front portion of the upper swivel body.

The upper swivel body is usually provided with a driver's cab. However, there are cases where small hydraulic shovels have not a driver's cab but a driver's seat.

Furthermore, the frame of the swivel body is provided with an engine, a hydraulic pump, cooling units, batteries, control valves, a fuel tank, a working-oil tank, etc.

The construction machine performs various operations such as traveling by the lower travel body, swiveling by the upper swivel body, digging by the working unit, etc. These operations are performed by a hydraulic actuator, constructed of a hydraulic motor, a hydraulic cylinder, etc. As shown in FIG. 11, pressure oil is supplied to the hydraulic actuator by the hydraulic pump 05 that is driven by the engine 03.

In addition, units, such as the engine 03, radiator 06, hydraulic pump 05, and direction-switching valves for switching the direction of the pressure oil supplied from the hydraulic pump 05, are disposed within the upper swivel body.

The upper swivel body is provided with an engine room 02 having a cover 01. Within the engine room 02, the engine 03 is provided, and the radiator 06 for cooling the engine 03, an oil cooler 010 for cooling working oil, an intercooler 08 for cooling air which is supplied to the combustion chamber of the engine 03, and a condenser 012, are disposed.

The intercooler 08, oil cooler 010, radiator 06, and condenser 012 constitute a first cooling unit group R which is used to cool working oil and cooling water. To expose the first cooling unit group R to cooling air and then cool the coolants of the first cooling unit group R, a cooling fan 014 is disposed. The cooling fan 014 is driven by the engine 03.

The cover 01 that constitutes part of the engine room 02 is provided with outside-air introducing ports 01a for introducing the outside air, and exhaust ports 01b for discharging the introduced air. The introduced air cools the first cooling unit group R and then the engine 03, the hydraulic pump 05, and the direction switching valves. Thereafter, the air that has reached high temperature is discharged from the exhaust ports 01b to the outside.

With this arrangement, cooling air is introduced through the outside-air introducing ports 01a. Within the engine room 02, a flow of air occurs as indicated by arrows, cools the engine 02, the hydraulic pump 05, the direction switching valves, etc., and is discharged from the exhaust ports 01b.

As shown in FIG. 11, with respect to the first cooling unit group R provided within the engine room 02, the cooling air flows in the order of condenser 012, intercooler 08, oil cooler 010, and radiator 06 from the upstream side.

The intercooler 08 is used for cooling air compressed by a supercharger 016 that increases the pressure of the fuel-air mixture in the engine 03. Because of this, a filter unit 017 is provided on the exterior of the engine room 02 to prevent the entry of dust and dirt.

The supercharger 016 is used to compress introduced air by rotating the turbine with the energy of the exhaust gas of the engine 03. Since the temperature of the introduced air rises due to adiabatic compression, it is necessary to cool the introduced air before it is supplied to the engine 03, for the output of the engine 03 and purification of the exhaust gas.

The introduced air is cooled by the intercooler 08, and is generally cooled to about 40 to 70° C. at the normal temperature.

Since the coolant of the intercooler 08 has to be cooled to a temperature lower than those of other heat exchangers, and the quantity of the radiant heat of the oil cooler 010 and the radiator 06 is relatively large, the intercooler 08 is generally disposed on the most upstream side of a flow of air, or on the upstream side from the radiator 06.

Since the supercharger 016 must be disposed on a portion of the engine 03, conduits 018, 019 for circulating compressed air are connected between the supercharger 016 and the intercooler 08 and between the intercooler 08 and the engine 03.

For the aforementioned reasons, the aforementioned heat exchange is performed in the order of condenser 12, intercooler 08, oil cooler 010, and radiator 06, and in order to enhance the cooling efficiency, the condenser 12, the intercooler 08, the oil cooler 010, and the radiator 06 are disposed in close proximity to one another. However, in construction fields, dust and dirt tend to adhere to the condenser 012, the intercooler 08, the oil cooler 010, and the radiator 06. If dust and dirt adhere to the condenser 012, the intercooler 08, the oil cooler 010, and the radiator 06, the aforementioned various operations cannot be continued unless they are frequently cleaned.

In the case where the intercooler 08, the oil cooler 010, and the radiator 06 are disposed in the recited order, there are cases where, in a narrow space within the engine room 02 of the hydraulic shovel, particularly a narrow space within the engine room of a small hydraulic shovel, rotation of the oil cooler 010 becomes difficult. In the case where the intercooler 08 is disposed so as to face the oil cooler 010 or radiator 06, the intercooler 08 becomes a hindrance and therefore the oil cooler 010 cannot be cleaned.

Hence, the radiator 06 or oil cooler 010 is made of a lightweight aluminum alloy so that it can be easily lifted upward. The radiator 06 or oil cooler 010 is first lifted upward to form an open space behind the intercooler 08. Then, the intercooler 08 is cleaned, for example, with an air jet nozzle. The removed radiator 06 or oil cooler 010 is also cleaned, and is returned to the original position.

Because the air suction and exhaust tubes of the intercooler 08 are large in diameter and are generally fixed on the upper swivel body, the aforementioned operation becomes necessary.

In addition, in the conventional construction machine shown in FIG. 11, the first cooling unit group R, the engine 03, and the hydraulic pump 05 are disposed in a cooling-air passage which is widely communicated through a core having the area of the wide cooling-air passage of the cooling units within the engine room 02. Therefore, there is a fear that noise generated by the engine 03 and the cooling fan 014 will be transmitted from the wide area to the outside.

In the conventional construction machine, if the first cooling unit group R is not cleaned, the cooling fan 014 will be clogged by dust and dirt. As a result, the circulation of the cooling air for the first cooling unit group R is reduced and the cooling efficiency becomes low. Because of this, the performance of the construction machine cannot be sufficiently utilized. In addition, to clean the radiator 06 or oil cooler 010, removing and installing the radiator 06 or oil cooler 010 require labor and time, resulting in a reduction in the operation efficiency. Furthermore, as described above, there is a fear that noise will be transmitted to the outside of the construction machine.

The present invention has been made in view of the problems mentioned above. Accordingly, it is the primary object of the present invention to provide a construction machine that is capable of easily cleaning the cooling units, enhancing the cooling efficiency, and reducing noise. The construction machine is equipped with a first cooling unit group consisting of a plurality of cooling units, and a second cooling unit group where some cooling units in the first cooling unit group are disposed in parallel. The remaining cooling unit of the first cooling unit group is disposed with a gap between itself and the second cooling unit group, or is disposed in parallel with the second cooling unit group. The construction machine is further equipped with a cooling fan disposed so that it faces the cooling units disposed as described above.

DISCLOSURE OF THE INVENTION

To achieve the object of the present invention mentioned above, there is provided a first construction machine comprising: a nearly sealed engine room section where an engine is disposed; a first cooling unit group comprising a plurality of cooling units; and a single cooling fan for cooling a second cooling unit group where some cooling units of the first cooling unit group are disposed in parallel; wherein the second cooling unit group and the cooling fan are disposed so that they face each other.

With this arrangement, cleaning of the cooling units can be easily performed and the cooling efficiency can be enhanced. In addition, the leakage of engine noise can be reduced.

In accordance with the present invention, there is provided a construction machine comprising: a first cooling unit group comprising a plurality of cooling units; a cooling fan for cooling a second cooling unit group where some cooling units of the first cooling unit group are disposed in parallel; an engine; a partition member provided between the cooling fan and the engine; a chamber, partitioned and formed by the partition member, where the first cooling unit group and the cooling fan are disposed; and a nearly sealed engine room section, partitioned by the partition member, where the engine is disposed; wherein the cooling fan comprises a single cooling fan.

With this arrangement, cleaning of the cooling units can be easily performed. In addition, the leakage of engine noise can be reduced and the cooling efficiency can be enhanced.

In the first and second construction machines of the present invention, the second cooling unit group and the remaining cooling unit of the first cooling unit group are disposed so that they face each other. With this arrangement, the whole of the cooling units can be made compact. In addition, the cooling efficiency can be enhanced with the single cooling fan, and the operation cost can be reduced.

In the construction machines of the present invention, a gap is provided between the second cooling unit group and the remaining cooling unit so that cleaning can be performed. With this arrangement, dust and dirt on the cooling units can be easily cleaned, for example, by inserting an air jet nozzle into the gap.

In the construction machines of the present invention, a gap-closing cover is provided to nearly close at least the circumference of the gap and is rotatable or detachable. This can prevent a reduction in the cooling efficiency due to the leakage of the cooling air from the gap. In the case where the rotatable or detachable gap-closing cover is used, the cooling efficiency can be enhanced. In addition, in cleaning the cooling units, the rotatable or detachable gap-closing cover is rotated or removed, and dust and dirt on the cooling unit can be easily cleaned, for example, by inserting an air jet nozzle into the gap.

In the construction machines of the present invention, the gap D between the second cooling unit group and the remaining cooling unit of the first cooling unit group disposed so as to face the second cooling unit group is set so that a ratio of the gap D to a height H of a cooling unit of the second cooling unit group on the upstream side of the remaining cooling unit is D/H=0.05 to 0.3. With the ratio D/H, a degree of freedom in designing the gap D and the height H can be increased and the gap D and the height H can be suitably disposed according to design specification.

In the first and second construction machines of the present invention, the gap D is set to about 30 to 300 mm, preferably about 40 to 100 mm. Because of this, there is an effect that the cooling units can be easily set according to design specification by the gap D.

In the construction machines of the present invention, the cooling unit of the second cooling unit group on the upstream side of the remaining cooling unit comprises an intercooler. This makes it possible to easily perform cleaning of the cooling units including the intercooler.

In the construction machine of the present invention, the nearly sealed engine room section is constructed so that cooling air introduced by the cooling fan is drawn in, or is constructed so that it is ventilated by discharging the cooling air within the nearly sealed engine room section, which has risen in temperature, from blowoff bores of the partition member with the cooling air introduced by the cooling fan.

With this construction, the leakage of noise from the engine to the outside can be effectively reduced.

In the first and second construction machines of the present invention, the cooling fan comprises an axial flow fan, a bent axis flow fan, or a centrifugal fan. Therefore, by suitably using an axial flow fan, a bent axis flow fan, or a centrifugal fan, the cooling efficiency can be enhanced and the cooling fan can be made compact.

In the construction machines of the present invention, the nearly sealed engine room section is provided with an ejector. With the ejector, cooling within the nearly sealed engine room section can be efficiently performed.

In the construction machines of the present invention, the nearly sealed engine room section is provided with an ejector and a ventilating fan. The synergetic effect of the ejector and the ventilating fan can enhance the cooling effect within the nearly sealed engine room section.

The construction machine of the present invention further comprises cylindrical guide members which have a communicating bore corresponding and communicating with a communicating bore or blowoff bore provided in the partition member. The cylindrical guide members make it possible to enhance the cooling effect within the nearly sealed engine room section.

BRIEF DESCRIPTION OF THE DRAWINGS

The present invention will be described in further detail with reference to the accompanying drawings wherein.

BEST MODE FOR CARRYING OUT THE INVENTION

Embodiments of the present invention will hereinafter be described with reference to the drawings.

(A) First Embodiment

Figure 1:
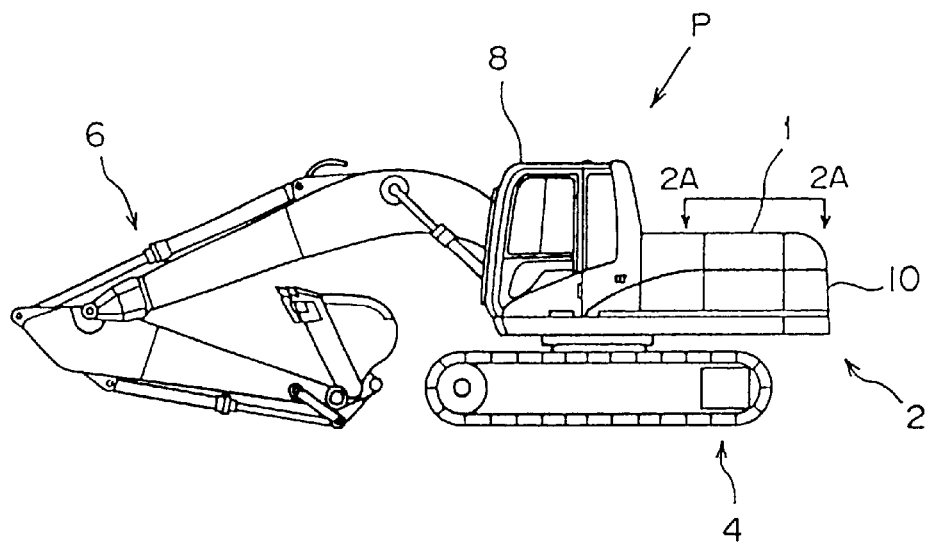
FIG. 1 is a diagrammatic side view showing a hydraulic shovel to which a construction machine of a first embodiment of the present invention is applied.

FIG. 1 shows a hydraulic shovel to which a construction machine of a first embodiment of the present invention is applied.

The hydraulic shovel P of the first embodiment of the present invention, as shown in FIG. 1, is constructed of an upper swivel body 2, a lower travel body 4, and a working unit 6.

The front end portion of the upper swivel body 2 is provided with a driver's cab 8, and the rear end portion is provided with a counterweight 10. Furthermore, a suction-type engine room 12, as shown in FIGS. 2 and 3, is provided on the frame of the upper swivel body 2 and disposed in front of the counterweight 10 of the hydraulic shovel P.

Within this engine room 12, there is provided a first cooling unit group R, which consists of an intercooler 14, an oil cooler 16, and a radiator 18.

The oil cooler 16 and the intercooler 14 in the first cooling unit group R are disposed in parallel in a vertical direction and constitute a second cooling unit group R1. The radiator 18, which is the remaining cooling unit RN of the first cooling unit group R, is disposed on the downstream side of the second cooling unit group R1. The oil cooler 16 is disposed in close proximity to the upper portion of the radiator 18. The intercooler 14 is disposed in close proximity to the lower portion of the oil cooler 16 with the gap D between the intercooler 14 and the radiator 18, determined by design specification.

Figure 2:
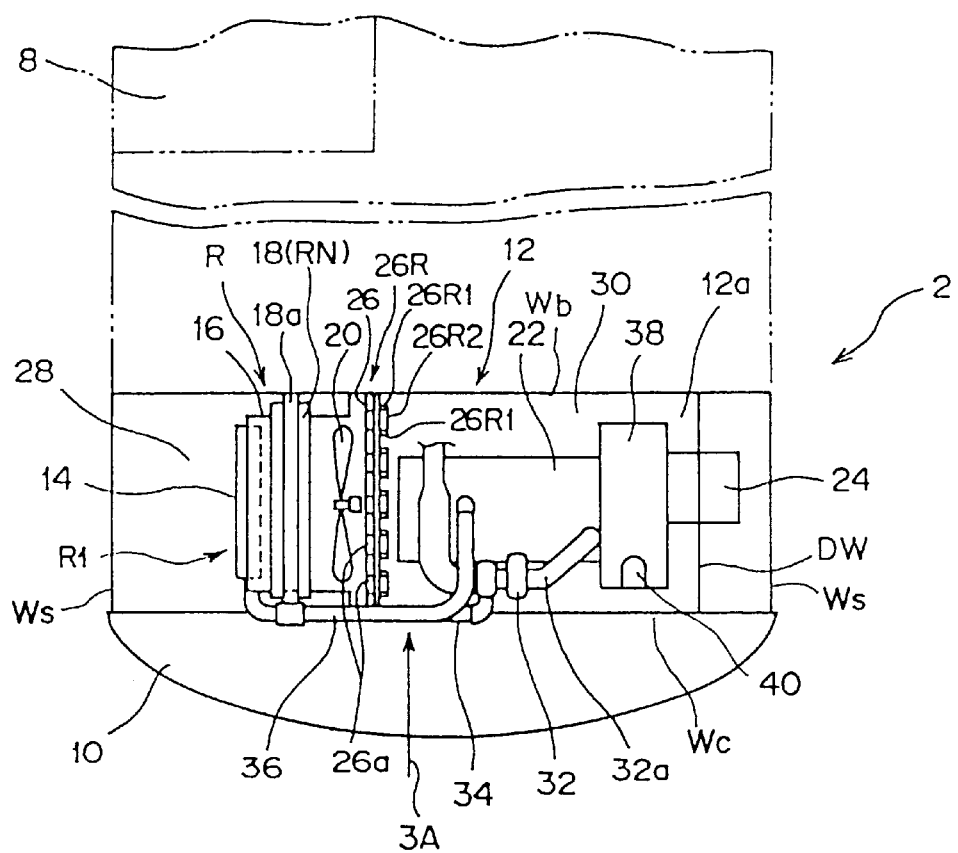
FIG. 2 is a diagrammatic plan view taken along line 2A—2A in FIG. 1.
Figure 3:
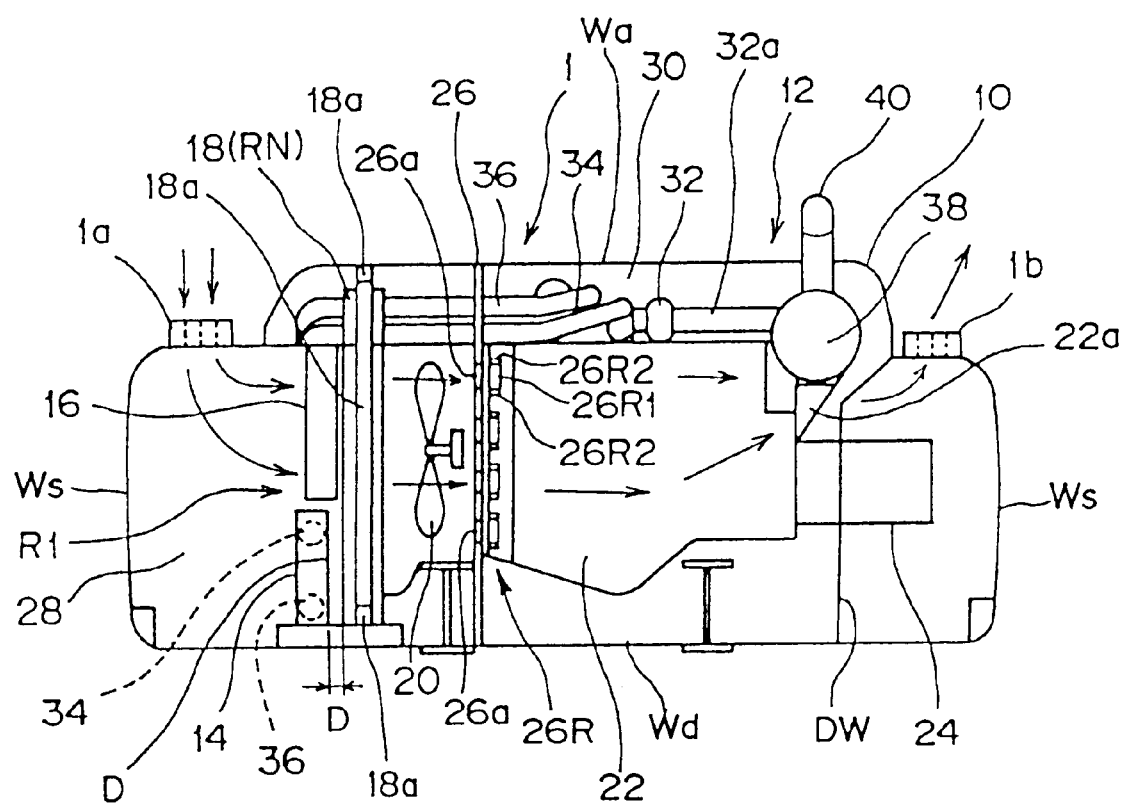
FIG. 3 is a diagrammatic end elevational view taken in the direction of arrow 3A in FIG. 2.

In addition, as shown in FIGS. 2 and 3, a single cooling fan 20 is provided on the downstream side of the first cooling unit group R disposed within the engine room 12 and is used to cool the first cooling unit group R.

Furthermore, an engine 22 and a hydraulic pump 24 connected to the engine 22 are provided behind the cooling fan 20. Between the engine 22 and the hydraulic pump 24, there is provided a partition plate DW.

A partition member 26 is provided between the cooling fan 20 and the engine 22. Within a chamber 28 partitioned and formed by the partition member 26, the first cooling unit group R and the cooling fan 20 are disposed. Within a nearly sealed engine room section 30, partitioned by the partition member 26 and nearly sealed, the engine 22 and the hydraulic pump 24 are disposed. The aforementioned second cooling unit group R1 (the intercooler 14 and the oil cooler 17 in the first embodiment) and the remaining cooling unit RN (the radiator 18 in the first embodiment) of the first cooling unit group R are disposed so as to face each other, and are cooled by the single cooling fan 20.

A plurality of guide members 26R are provided on the downstream side of the partition member 26 (back surface of the partition member 26). Each guide member 26R is formed in cylindrical form by guide pieces 26R1, 26R2 provided around a communicating bore 26a formed in the partition member 26. In the first embodiment, the guide member 26R is square in cross section.

This guide member 26R has at least the size of the communicating bore 26a formed in the partition member 26. It is preferable that the guide member 26R be a communicating bore larger than the communicating bore 26a.

In the case where a supercharger 32 is provided in the engine 22, as shown in FIG. 3, conduits 34, 36 for circulating compressed air are connected between the supercharger 32 and the intercooler 14 and between the intercooler 14 and the engine 22, respectively. The conduits 34, 36 penetrate the partition member 26, the radially outer portion of the radiator 18, and a partition plate 18a. The partition plate 18a is provided between an upper partition wall (engine hood) Wa, a front partition wall Wb, a rear partition wall Wc, and a bottom partition wall Wd which constitute a cover 1. The cover 1 constitutes the engine room 12. The cover 1 further has side partition walls Ws, Ws between the front partition wall Wb and the rear partition wall Wc.

A muffler 38 connected to an exhaust port is provided on the rear upper portion of the engine 22 so that exhaust gas is discharged from the engine 22 through an exhaust pipe 40. In addition, part of the exhaust gas is supplied to the supercharger 32 through an exhaust pipe 32a to drive the supercharger 32.

Figure 4A:
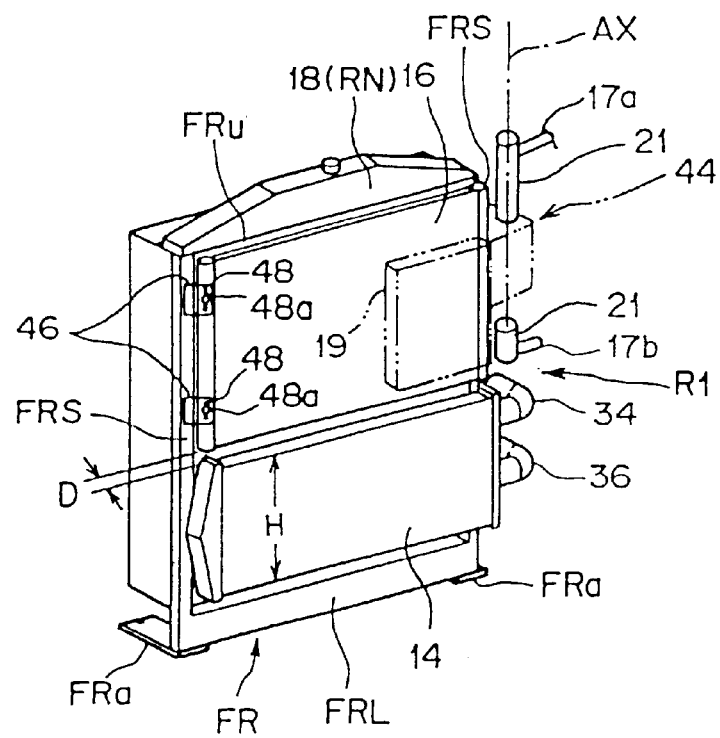
FIG. 4(A) is an enlarged perspective view showing the cooling units shown in FIG. 3, the radiator being disposed so as to face the oil cooler and the intercooler, disposed in parallel in a vertical direction.
Figure 4B:
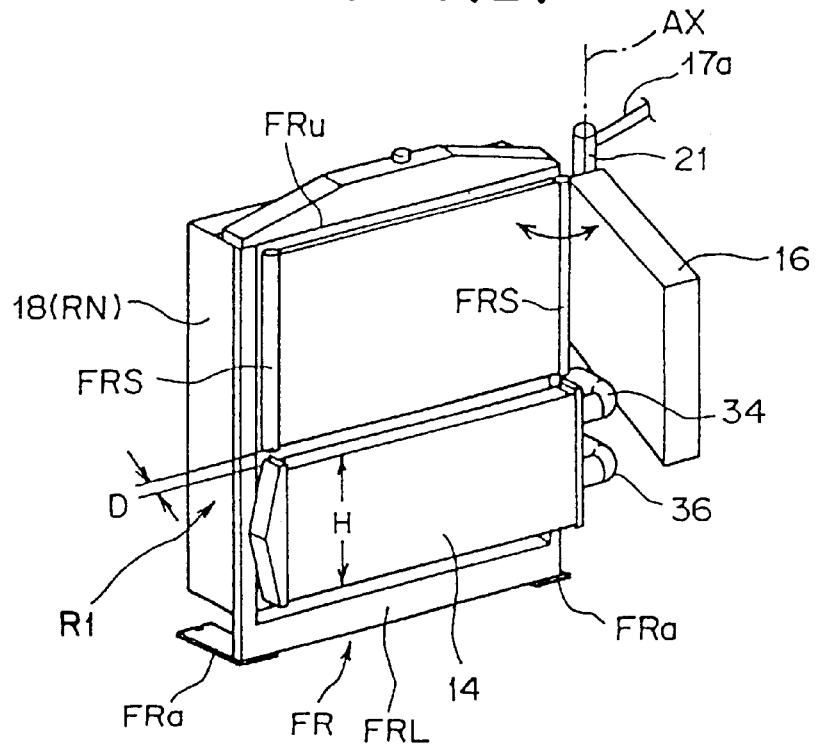
FIG. 4(B) is an enlarged perspective view showing the state in which the oil cooler has been rotated so that the intercooler can be cleaned.

As shown in FIGS. 4(A) and 4(B), the oil cooler 16, for example, is constructed so that it is rotatable on a rotation axis AX through a hinge mechanism 44 provided between the oil cooler 16 and the radiator 18 (or the upper swivel body 2). The conduits 17a, 17b of the oil cooler 16 are connected through rotatable tube fittings 21, 21. The tube fittings 21 are rotatable coaxially with the rotation axis AX and provided on a working-oil supply side and a working-oil exhaust side. Therefore, even if the oil cooler 16 rotates, the conduits 17a, 17b are prevented from being twisted or damaged.

The suction-type nearly sealed engine room section 30 of the first embodiment is constructed as described above. Therefore, if the engine 22 and the cooling fan 20 are operated, cooling air is introduced through the outside-air introducing port 1a of the cover 1 and then cools the first cooling unit group R. Thereafter, the cooling air passes through the communicating bores 26a of the partition member 26 and through the guide members 26R, is introduced into the nearly sealed engine room section 30, and cools the engine 22, the muffler 38, etc. After that, the cooling air is discharged from an exhaust port 1b provided on the cover 1.

In this manner, the radiator 18, the oil cooler 16, and the intercooler 14 are efficiently cooled with the single cooling fan 20. However, cleaning of the first cooling unit group R must be frequently performed. For example, particularly, in a construction site where dismantling of a structure is performed, cleaning of the first cooling unit group R must be performed every day, or a plurality of times a day as occasion demands.

In performing the above-mentioned cleaning operation, the construction of the first cooling unit group R of the first embodiment is useful.

That is, the oil cooler 16 of the second cooling unit group R1 (oil cooler 16 and intercooler 14) of the first cooling unit group R (radiator 18, oil cooler 16, and intercooler 14) is rotatable as shown in FIG. 4(B) through the hinge mechanism 44 with respect to the remaining cooling unit RN (radiator 18) of the first cooling unit group R so that an open space can be formed above the top surface of the intercooler 14. Therefore, the intercooler 14 and the radiator 18 can be easily cleaned by inserting an air jet nozzle into the gap between the radiator 18 and the intercooler 14 and then jetting air. Similarly, the oil cooler 16 and the radiator 18 in the open states can be easily cleaned with a jet of air.

After the cleaning, the oil cooler 16 is returned to its original position, as shown in FIG. 4(A). The oil cooler 16 can be easily and detachably fastened by engaging thumbscrews 48a with the engaging bolt 48 of a hinge mechanism 46 that is used as a stopper member provided between the oil cooler 16 and the intercooler 14.

The gap D between the intercooler 14 and at least one cooling unit (radiator 18 in the first embodiment) of the first cooling unit group R is suitably determined by design specification. For instance, the gap D is determined so that a ratio of D/H becomes about 0.05 to 0.3. The letter H in the ratio of D/H represents the height of the intercooler 14 that faces at least one cooling unit (radiator 18 in the first embodiment) of the first cooling unit group R.

The gap D is usually set to about 30 to 200 mm. In the case of large machine types and special machine types, the gape D is set to about 30 to 300 mm. It is preferable that the gap D be set to about 40 to 100 mm.

In the first embodiment, the intercooler 14 is disposed so that it faces one cooling unit of the first cooling unit group R. However, the cooling unit that faces one cooling unit of the first cooling unit group R is not limited to the intercooler 14. In the case where two other cooling units in the first cooling unit group R are disposed so that they face each other, the same effect as the first embodiment can be obtained, if the aforementioned gap D is provided between the two cooling units.

Next, a first modification of the first embodiment shown in FIG. 4 will be described with reference to FIG. 5. The same reference numerals will be applied to practically the same parts as the first embodiment, and a description will be given of points differing from the first embodiment.

Figure 5:
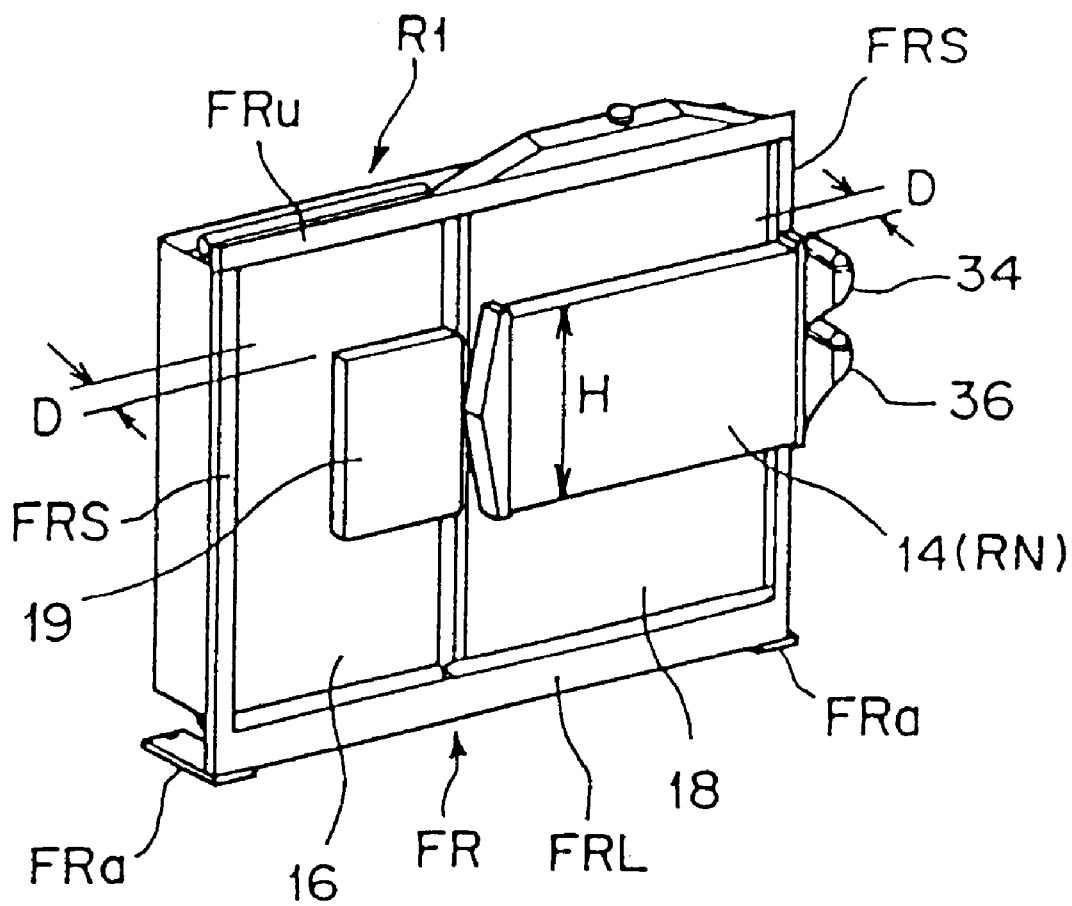
FIG. 5 is an enlarged perspective view showing a first modification of the first embodiment shown in FIG. 4(A)

In the first modification, with the gap D between the radiator 18 of the second cooling unit group R1 (oil cooler 16 and radiator 18) and the remaining cooling unit RN (intercooler 14) of the first cooling unit group R (oil cooler 16, radiator 18, and intercooler 14), the remaining cooling unit RN (intercooler 14) of the first cooling unit group R is disposed as shown in FIG. 5. Furthermore, a condenser 19 for an air conditioner is disposed with the gap D between itself and the oil cooler 16.

As with the first embodiment, cooling can be performed with the single cooling fan 20. Therefore, the operation costs can be reduced. In addition, cleaning can be easily performed by inserting the aforementioned air jet nozzle into the gap D between the intercooler 14 and the radiator 18 and the gap D between the oil cooler 16 and the condenser 19 and then jetting air. Therefore, the operation efficiency can be enhanced.

Next, a second modification of the first embodiment shown in FIG. 5 will be described with reference to FIG. 6. The same reference numerals will be applied to practically the same parts as the first embodiment, and a description will be given of points differing from the first embodiment.

Figure 6A:
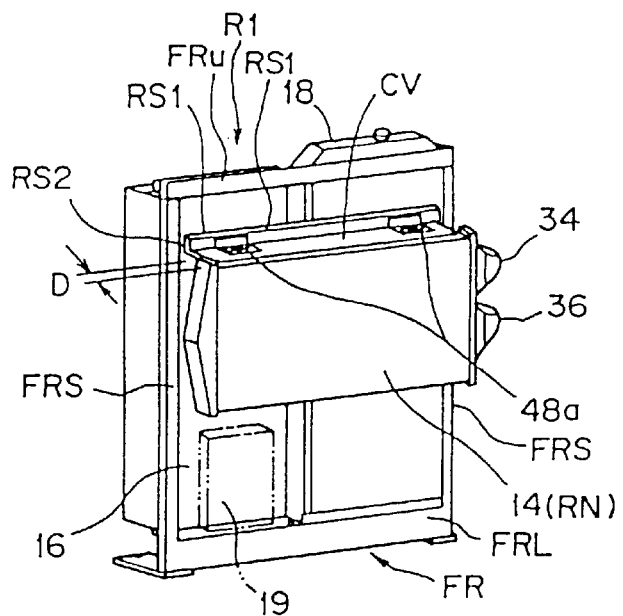
FIG. 6(A) is an enlarged perspective view showing a second modification of the first embodiment shown in FIG. 5, the radiator and the oil cooler being disposed in parallel and the intercooler being disposed with a gap between itself and them.

In the second modification, with the gap D between the second cooling unit group R1 (oil cooler 16 and radiator 18) and the remaining cooling unit RN (intercooler 14) of the first cooling unit group R (oil cooler 16, radiator 18, and intercooler 14), the remaining cooling unit RN (intercooler 14) of the first cooling unit group R is disposed as shown in FIG. 6(A).

As with the first embodiment, cooling can be performed with the single cooling fan 20. Therefore, the operation costs can be reduced. In addition, cleaning can be easily performed by inserting the aforementioned air jet nozzle into the gap D between the second cooling unit group R1 (oil cooler 16 and radiator 18) and the remaining cooling unit RN (intercooler 14) and then jetting air. Therefore, the operation efficiency can be enhanced.

In the first embodiment and the first and second modifications shown in FIGS. 2 to 6(A), if gap-closing covers CV are provided to nearly close at least the circumference of the gap D shown in FIG. 6(A), or if rotatable or detachable gap-closing covers CV of elastic material are provided along the perimeter of the intercooler 14 so that they are detachable or rotatable with female screws 48a, a reduction in the cooling efficiency due to the leakage of cooling air from the gap D can be prevented.

In the case where rotatable or detachable gap-closing covers CV are provided, the cooling efficiency can be enhanced. In addition, if the rotatable or detachable gap-closing covers CV are rotated or removed when cleaning is performed, dust and dirt on the cooling units can be easily cleaned, for example, by inserting an air jet nozzle into the gap D.

Other examples of the mounting structure for the gap-closing cover CV shown in FIG. 6(A) will be described with reference to FIGS. 6(B) to 6(D).

Figure 6B:
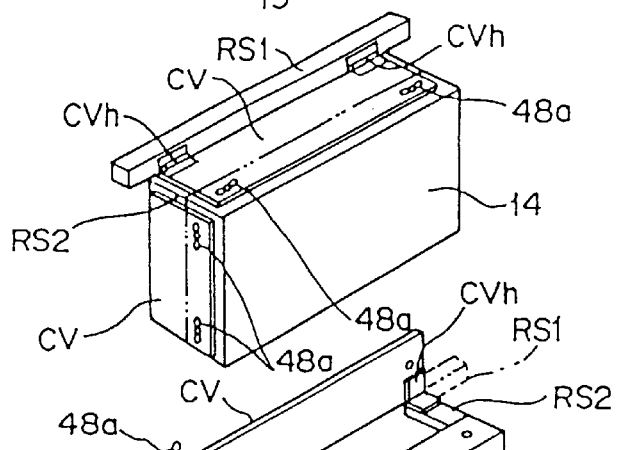
FIG. 6(B) is an enlarged perspective view showing another example of the gap-closing cover shown in FIG. 6(A)

In the example shown in FIG. 6(B), brackets RS2 extend from a frame RS1 attached to the radiator 18 and the oil cooler 16 and are attached to the intercooler 14. One end of a gap-closing cover CV is rotatably attached to the frame RS1 through hinges CVh, while the other end is detachably attached to the intercooler 14 by thumbscrews 48a. In this way, a plurality of gap-closing covers CV are disposed along the outer perimeter of the intercooler 14 so that the aforementioned gap D is closed.

Figure 6C:
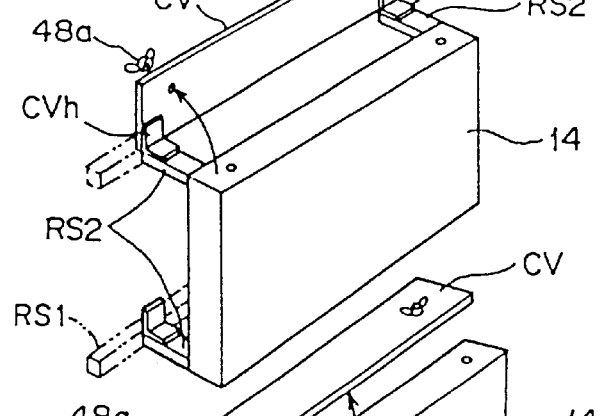
FIG. 6(C) is an enlarged perspective view showing the case where two gap-closing covers are provided on the upper and lower portions of the intercooler.

In the example of FIG. 6(C), the aforementioned gap-closing covers CV are provided on the top surface and bottom surface of the intercooler 14. This structure is employed when the aforementioned gap D is small. In this case, cost reduction can be achieved.

Figure 6D:
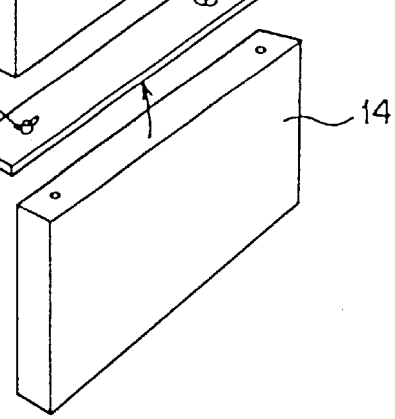
FIG. 6(D) is an enlarged perspective view showing the case where the gap-closing cover is detachably provided on the top surface of the intercooler.

In the example of FIG. 6(D), the aforementioned gap-closing covers CV are detachably attached to the outer perimeter of the intercooler 14 by thumbscrews 48a so that the aforementioned gap D is closed.

In addition, if the gap-closing covers CV described in FIG. 6 are provided to close the gap D shown in FIGS. 2 to 5, the leakage of the aforementioned cooling air from the gap D will be prevented and therefore the cooling efficiency can be enhanced.

Figure 7:
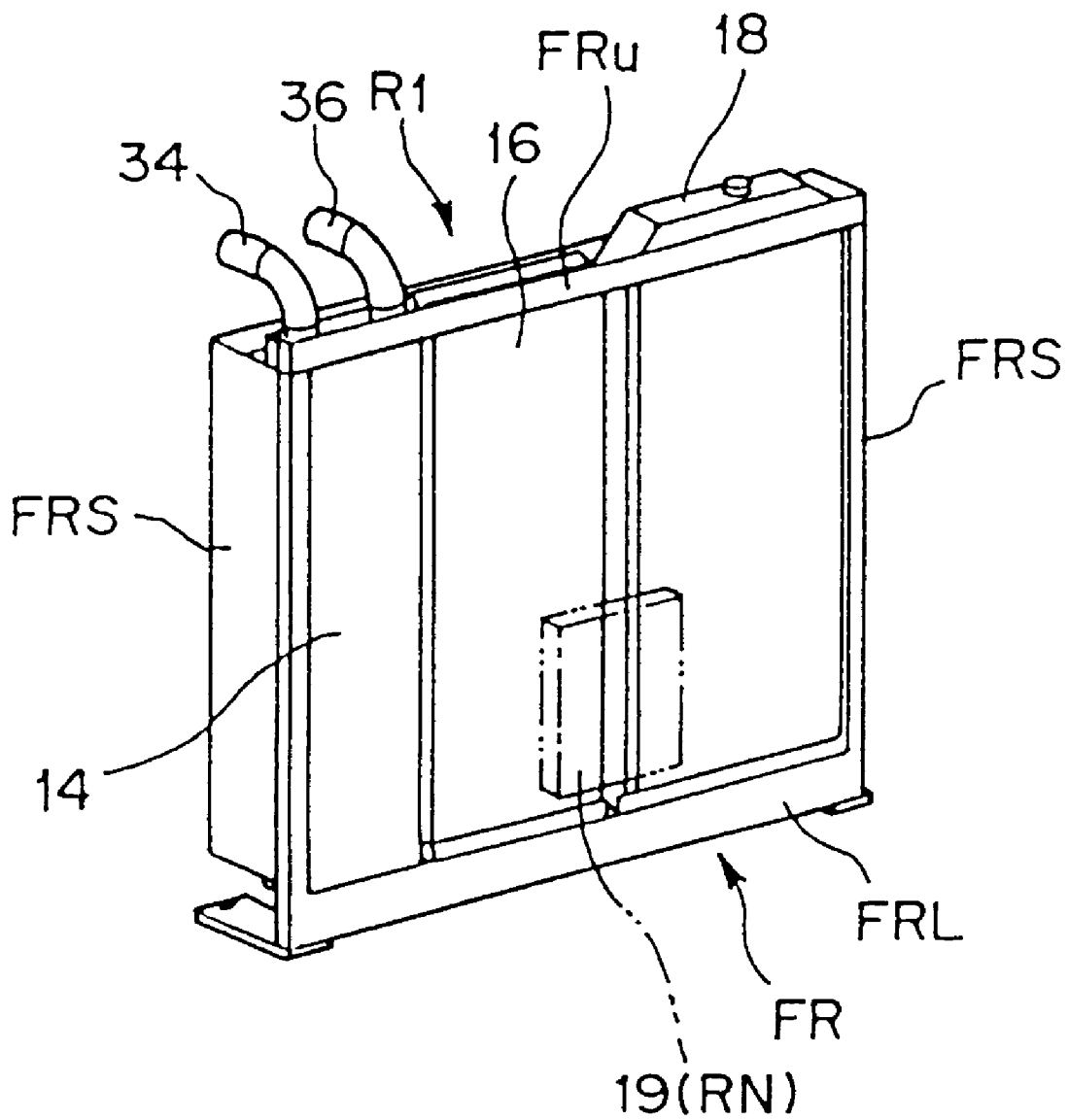
FIG. 7 is an enlarged perspective view showing a third modification of the first embodiment shown in FIG. 6(A)

Next, a third modification of the first embodiment shown in FIG. 6(A) will be described with reference to FIG. 7. The same reference numerals will be applied to practically the same parts as the first embodiment, and a description will be given of points differing from the first embodiment.

In the third modification, the aforementioned second cooling unit group R1, in which some cooling units in the aforementioned first cooling unit group R (intercooler 14, oil cooler 16, radiator 18, and condenser 19) are disposed in parallel, consists of an intercooler 14, an oil cooler 16, and a radiator 18.

The remaining cooling unit (condenser 19) RN of the first cooling unit group R is provided on a suitable place on the second cooling unit group R1 disposed as shown in FIG. 6.

As with the first embodiment, the intercooler 14, the oil cooler 16, and the radiator 18 can be cooled with the single cooling fan 20. Therefore, the operation costs can be reduced. In addition, the intercooler 14, the oil cooler 16, and the radiator 18 are individually disposed. Because of this, they can be easily cleaned by jetting air directly to them, without performing rotation and providing the gap D as in the aforementioned cases. Therefore, the operation efficiency can be enhanced.

(B) Second Embodiment

Figure 8:
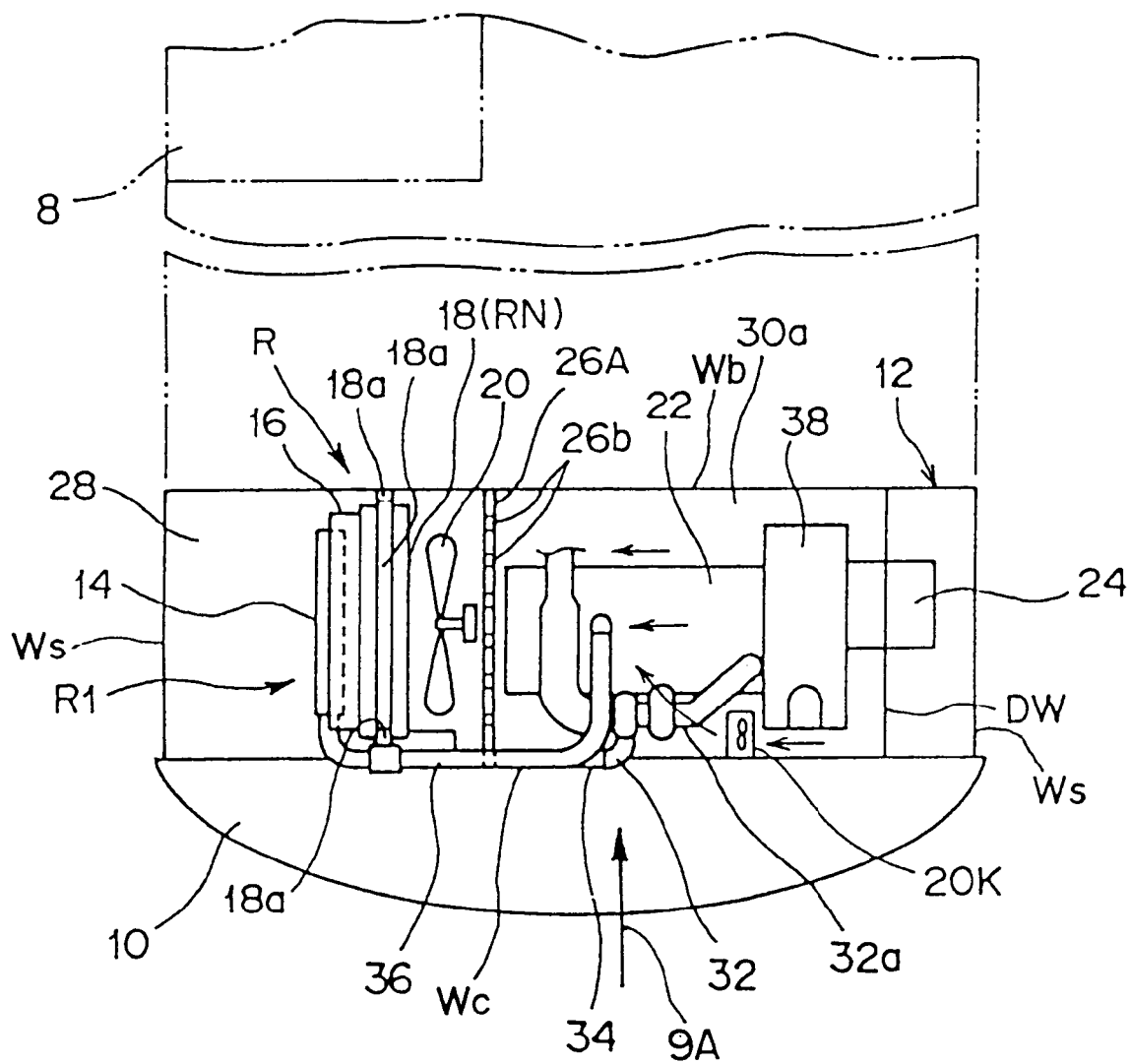
FIG. 8 is a diagrammatic plan view showing a construction machine according to a second embodiment of the present invention.

The second embodiment of the present invention will be described with reference to FIGS. 8 and 9. The same reference numerals will be applied to practically the same parts as the first embodiment, and a description will be given of points differing from the first embodiment.

The arrangement of the cooling units in the second embodiment is the same as the first embodiment shown in FIG. 4. Therefore, the engine room of the second embodiment constitutes a blowoff-type nearly sealed engine room section 30a, as shown in FIGS. 8 and 9.

Figure 9:
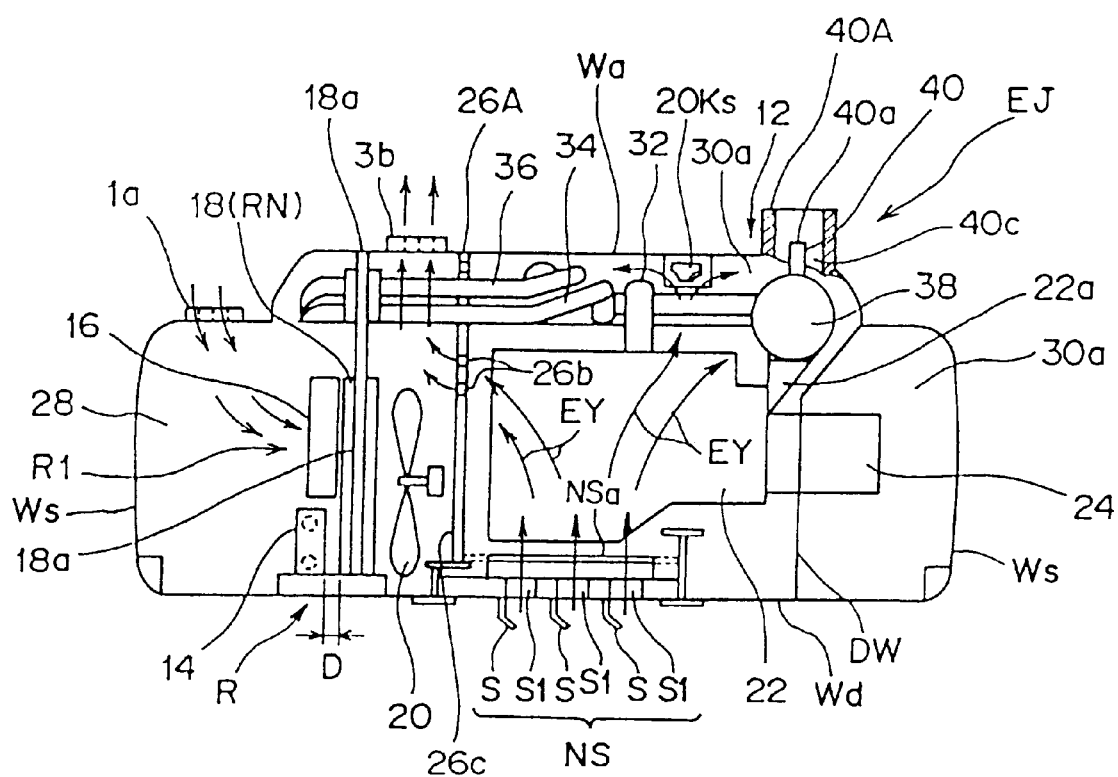
FIG. 9 is a diagrammatic end elevational view taken in the direction of arrow 9A in FIG. 8.

The partition member 26A of the nearly sealed engine room section 30a has a plurality of blowoff bores 26b in the upper portion thereof, as shown in FIG. 9. The lower portion of the partition member 26A is formed into a non-bored portion 26c. Therefore, the cooling air, which has been introduced through an outside-air introducing port 1a by actuation of the cooling fan 20 and has cooled the first cooling unit group R, impinges on the non-bored portion 26c of the partition member 26A, then flows upward, and is discharged from an exhaust port 3b.

The cooling air flowing upward flows along the front surface of the upper portion of the partition member 26A having the blowoff bores 26b, and generates a negative pressure region near the blowoff bores 26b. Because of the negative pressure, the cooling air within the nearly sealed engine room section 30a that has reached high temperature is passed through the blowoff bores 26b, and is discharged from the exhaust port 3b along with the cooling air that has cooled the first cooling unit group R. Therefore, air within the nearly sealed engine room section 30a can be efficiently ventilated. In addition, if the rear surface, on the engine side, of the partition member 26A are provided with the guide members 26R as in the first embodiment shown in FIGS. 2 and 3, the ventilation efficiency can be further enhanced.

In the second embodiment, the nearly sealed engine room section 30a is provided with an ejector EJ, as shown in FIG. 9. Because of the ejector EJ, the cooling effect within the nearly sealed engine room section 30a can be enhanced and the leakage of noise generated in the engine 22 and hydraulic pump 24 within the nearly sealed engine room section 30a can be reduced.

Now, a description will be given of the ejector EJ. In the exhaust system of the engine 22, a muffler 38 is connected to the exhaust tube 40 of the engine 22, and there is provided an upper partition wall Wa (or an engine hood) which constitutes part of the cover 1 of the nearly sealed engine room section 30a in which the exit port 40a of the muffler 38 is disposed.

If the ejector EJ (which consists of an outer tube and an inner tube to be described later and ejects the heated air within the nearly sealed engine room section 30a to the outside by employing the exhaust pressure in the engine 22 that is discharged to the outside) is provided in part of the upper partition wall Wa, the nearly sealed engine room section 30a, the engine 22, etc., can be more effectively cooled and the cooling efficiency can be enhanced.

The ejector EJ is constructed of an exit port 40a of an exhaust tube (inner tube) 40 extending from the muffler 38; an ejector tube 40A which surrounds the exit port 40a and extends from the upper partition wall Wa beyond the exit port 40a; and an ejector gap 40c, formed between the exit port 40a and the ejector tube 40A, which ejects air from the nearly sealed engine room section 30a.

If the bottom partition wall Wd of the nearly sealed engine room section 30a is provided with a plurality of slit intake ports S1 as needed to facilitate the ventilation of the nearly sealed engine room section 30a, the outside air introduced through the intake ports S1 will flow as indicated by arrows EY and therefore the ejector EJ can enhance the cooling efficiency.

The intake ports S1 are equipped with louvers S, respectively. The louvers S constitute noise suppression means NS that suppresses the leakage of engine noise from the nearly sealed engine room section 30a to the outside. As shown in FIG. 9, each louver S is formed by pulling up a plate portion which is left behind when cutting the bottom partition wall Wd to form the intake port S1.

If the noise suppression means NS is constructed so that the intake ports S1, formed into a box shape by a noise intercepting plate NSa, have a silencing effect and that the leakage of engine noise and introduced-air sound from the intake ports S1 to the outside of the nearly sealed engine room section 30a can be suppressed, the noise suppression means NS can further reduce the aforementioned leakage of noise.

Since negative pressure occurs around the engine exhaust air ejected from the exit port 40a of the exhaust tube 40 of the engine 22, the pressure near the ejector gap 40c becomes negative. Therefore, the air within the nearly sealed engine room section 30a, along with heat, can be forcibly discharged to the outside by pump action caused by the negative pressure.

Although not shown, a ventilating fan (e.g., an axial flow fan 20K shown in FIGS. 8 and 10 and a sirocco fan 20Ks shown in FIG. 9), along with the ejector EJ, can be suitably disposed, for example, near the supercharger 32 or muffler 38 of the nearly sealed engine room section 30a (which becomes a heat generation source) so that ventilation within the nearly sealed engine room section 30a is facilitated. In this case, the cooling efficiency can be further enhanced.

In the first and second embodiments, the partition member 26 or 26A is provided to constitute the nearly sealed engine room section 30 or 30a, so the leakage of noise from the engine 22 and the hydraulic pump 24 to the outside can be reduced.

The first and second embodiments have been described with reference to the case of employing an axial flow fan. However, even if various types of centrifugal fans and bent axis flow fans, including a sirocco fan, are used, the same effect as the first and second embodiments can be obtained.

(C) Third Embodiment

A description will be given of a third embodiment of the present invention using the above-mentioned sirocco fan.

Figure 10:
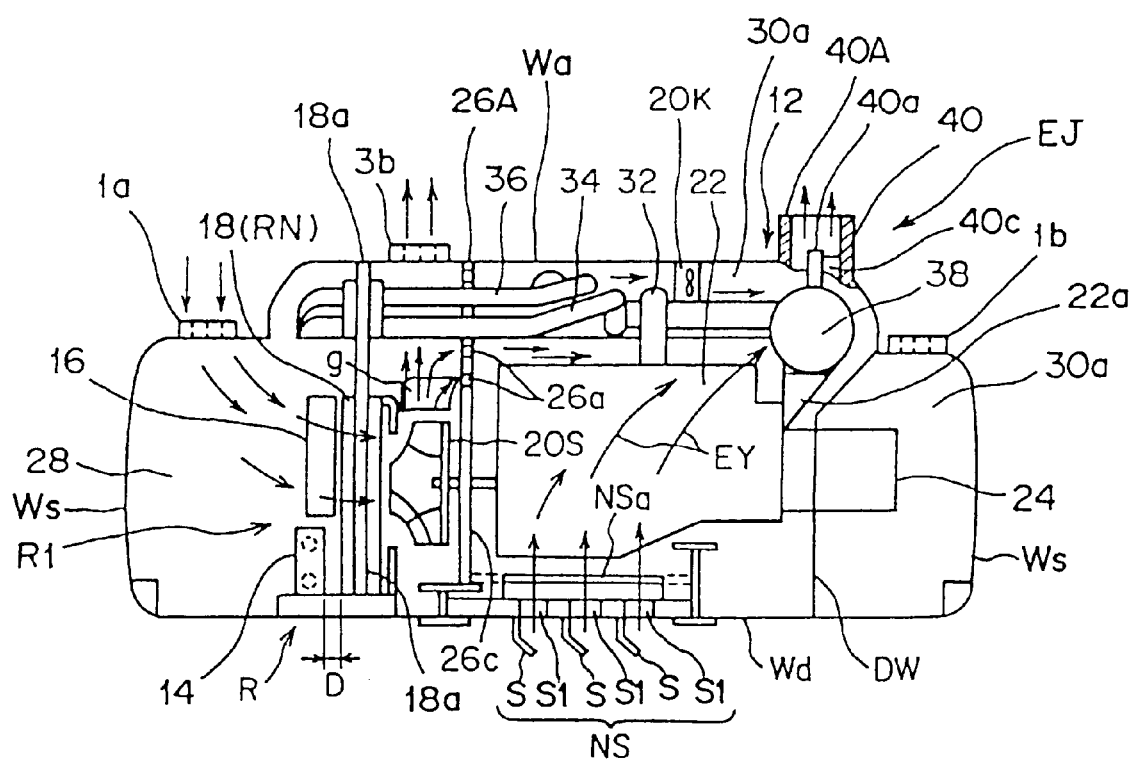
FIG. 10 is a diagrammatic end elevational view showing a construction machine according to a third embodiment of the present invention.
Figure 11:
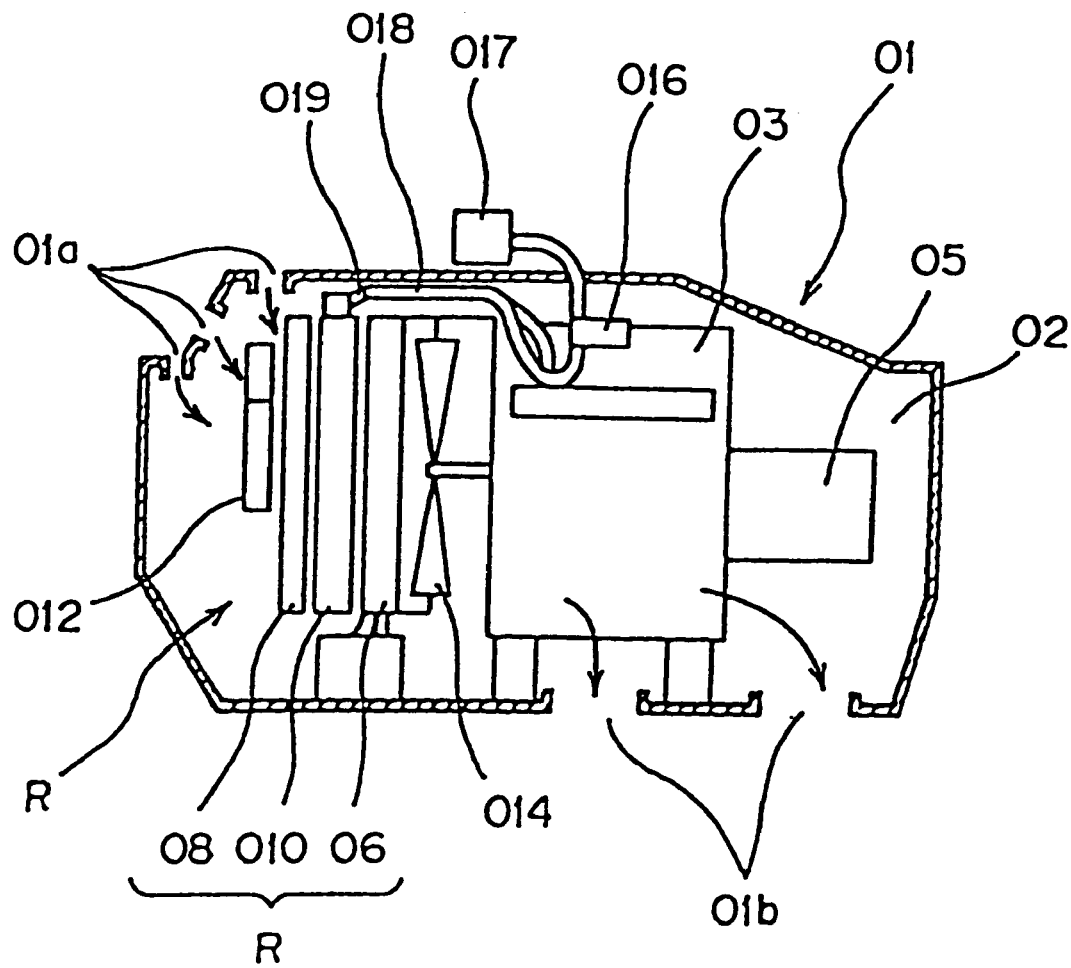
FIG. 11 is a vertical transverse sectional view showing the engine room of a conventional hydraulic shovel.

For instance, instead of the axial flow fan 20 of the second embodiment shown in FIG. 9, a sirocco fan 20s is employed as shown in FIG. 10. The same reference numerals will be applied to practically the same parts as the first and second embodiments, and a description will be given of points differing from the first and second embodiments.

The third embodiment, as shown in FIG. 10, is equipped with the ejector EJ described in the second embodiment of FIG. 9, but a description will first be made on the assumption that it is not equipped with the ejector EJ.

As shown in FIG. 10, the sirocco fan 20s is disposed between a partition member 26A and a first cooling unit group Rand is driven by drive means such as an engine 22, a hydraulic motor, an electric motor, etc. In addition to an exhaust port 3b, the exhaust port 1b described in the first embodiment is provided.

In the third embodiment, a guide member g is provided near the outer periphery of the sirocco fan 20s so that part of the cooling air from the sirocco fan 20s is supplied to a nearly sealed engine room section 30a through the communicating bores (suction bores) 26a of the partition member 26A. Therefore, part of the cooling air guided by the guide member g flows toward a muffler 38 and cools a supercharger 32.

In the third embodiment constructed as described above, if the engine 22 and the sirocco fan 20s are operated, cooling air is introduced through the outside-air introducing port 1a of a cover 1 and then cools the first cooling unit group R. Next, the cooling air flows in the circumferential direction of the sirocco fan 20s and is discharged from the exhaust port 3b. Furthermore, part of the cooling air guided by the guide member g cools the engine 22, the muffler 38, etc., and is discharged from the exhaust port 1b.

In addition, if the sirocco fan 20s is replaced with the axial flow fan 20 of the second embodiment shown in FIG. 9, the same operational effect as the second embodiment can be obtained.

Therefore, in the third embodiment, the efficiency of cooling the first cooling unit group R can be enhanced and the leakage of operation noise from the engine 22, the hydraulic pump 24, etc., can be reduced by the nearly sealed engine room section 30a. Furthermore, since the first cooling unit group R can be easily cooled, the operation rate of the above-mentioned construction machine can be enhanced.

If the ejector EJ of the second embodiment is provided as shown in FIG. 10, there is no need to provide the exhaust port 1b. Furthermore, both the ejector EJ and the exhaust port 1b may be disposed. Therefore, if the arrangement of the ejector EJ and the exhaust port 1b is determined according to the aforementioned various objects by design specification, the aforementioned cooling, noise reduction, cleaning, etc., can be more effectively performed.

(D) Others

While the present invention has been described with reference to the embodiments applied to a transverse engine, the invention is not to be limited to the transverse engine, but may be modified within the scope of the invention hereinafter claimed. For example, in the case where the present invention is applied to a vertical engine, various changes may be made where appropriate. In addition, numerous changes may be made according to changes in the conditions determined by design specification, or according to machine specification, etc.

INDUSTRIAL APPLICABILITY

The construction machine of the present invention, as described above, is equipped with a first cooling unit group R consisting of a plurality of cooling units, and a second cooling unit group R1 where some cooling units of the first cooling unit group R are disposed in parallel. The remaining cooling unit of the first cooling unit group R is disposed with a gap between itself and the second cooling unit group R1, or is disposed in parallel with the second cooling unit group R1. The construction machine is further equipped with a cooling fan disposed so that it faces the cooling units disposed as described above. With this arrangement, cleaning, cooling, and noise reduction can be efficiently performed. Thus, the present invention is useful as a construction machine that is capable of easily cleaning the cooling units, enhancing the cooling efficiency, and reducing noise.

What is claimed is:

1. A construction machine comprising:
   a first cooling unit group comprising a plurality of cooling units;
   a single cooling fan for cooling a second cooling unit group where one or more cooling units of said first cooling unit group are disposed in parallel;
   an engine;
   a partition member provided between said cooling fan and said engine and forming a chamber where said first cooling unit group and said cooling fan are disposed; an engine room section, partitioned by said partition member, where said engine is disposed; and
   cylindrical guide members each having a communicating bore corresponding to and communicating with a communicating bore or a blowoff bore provided in said partition member.

2. The construction machine as set forth in claim 1, wherein said second cooling unit group and any remaining cooling unit of said first cooling unit group not disclosed in parallel with other cooling units of said first cooling unit group are disposed so that they face each other.

3. The construction machine as set forth in claim 2, wherein a gap is provided between said second cooling unit group and said remaining cooling unit so that cleaning can be performed.

4. The construction machine as set forth in claim 3, wherein a gap-closing cover is provided to nearly close at least the circumference of said gap and is rotatable or detachable.

5. The construction machine as set forth in claim 3, wherein a gap between said second cooling unit group and the remaining cooling unit of said first cooling unit group disposed so as to face said second cooling unit group is set so that a ratio D/H of a width of said gap D to a height H of a cooling unit of said second cooling unit group on an upstream side of said remaining co ling unit is in the range of 0.05 to 0.3.

6. The construction machine as set forth in claim 5, wherein said gap is set to about 30 to 300 mm.

7. The construction machine as set forth in claim 6, wherein said cooling unit of said second cooling unit group on an upstream side of said remaining cooling unit comprises an intercooler.

8. The construction machine as set forth in claim 5, wherein said cooling unit of said second cooling unit group on the upstream side of said remaining cooling unit comprises an intercooler.

9. The construction machine as set forth in claim 5, wherein said gap is set to about 40 to 100 mm.

10. The construction machine as set forth in claim 5, wherein said engine room section is constructed so that cooling air introduced by said cooling fan is drawn in, or is constructed so that it is ventilated by discharging cooling air within said engine room section from blowoff bores in said partition member with cooling air introduced by said cooling fan.

11. The construction machine as set forth in claim 3, wherein said engine room section is constructed so that cooling air introduced by said cooling fan is drawn in, or is constructed so that it is ventilated by discharging cooling air within said engine room section from blowoff bores in said partition member with cooling air introduced by said cooling fan.

12. The construction machine as set forth in claim 11, wherein said engine room section is provided with an ejector.

13. The construction machine as set forth in claim 12, wherein said engine room section is provided with an ejector and a ventilating fan.

14. The instruction machine as set forth in claim 1, wherein said engine room section is constructed so that cooling air introduced by said cooling fan is drawn in, or is constructed so that it is ventilated by discharging cooling air within said engine room section from blowoff bores in said partition member with cooling air introduced by said cooling fan.

15. The construction machine as set forth in claim 14, wherein said cooling fan is an axial flow fan, a bent axis flow fan, or a centrifugal fan.

16. The construction machine as set forth in claim 1, wherein said cooling fan is an axial flow fan, a bent axis flow fan, or a centrifugal fan.

17. The construction machine as set forth in claim 1, wherein said engine room section is provided with an ejector.

* * * * *